United States Patent [19]

Ford et al.

[11] Patent Number: 5,021,941
[45] Date of Patent: Jun. 4, 1991

[54] POSITION CONTROL METHOD AND APPARATUS FOR A CLOSED LOOP TYPE NUMERICALLY CONTROLLED MACHINE

[75] Inventors: Derek G. Ford, Honley; Scott R. Postlethwaite, Dalton, both of England

[73] Assignee: Hepworth Engineering Limited, United Kingdom

[21] Appl. No.: 323,562

[22] Filed: Mar. 14, 1989

[30] Foreign Application Priority Data

Mar. 19, 1988 [GB] United Kingdom ............... 8806574

[51] Int. Cl.⁵ ............................................. G05B 13/02
[52] U.S. Cl. ................................... 364/176; 318/615; 318/632; 364/183; 364/474.35
[58] Field of Search ............... 364/474.35, 551.02, 364/167.01, 174, 176, 183, 571.01-571.08; 318/632, 611, 615-618, 561

[56] References Cited

U.S. PATENT DOCUMENTS

| | | | |
|---|---|---|---|
| 3,612,840 | 10/1971 | Stobbe | 364/474.35 |
| 3,917,930 | 11/1975 | Davey et al. | 364/474.35 X |
| 4,338,659 | 7/1982 | Kurakake | 364/474.35 |
| 4,446,409 | 5/1984 | Rawicz et al. | 318/632 |
| 4,456,863 | 6/1984 | Matusek | 318/632 X |
| 4,549,261 | 10/1985 | Mouhamed | 364/183 |
| 4,556,956 | 12/1985 | Dickenson et al. | 364/183 X |
| 4,707,780 | 11/1987 | Gose et al. | 364/474.35 X |

*Primary Examiner*—Joseph Ruggiero
*Attorney, Agent, or Firm*—Bernard L. Kleinke; Jerry R. Potts; William P. Waters

[57] ABSTRACT

In order to compensate for errors in the positioning of a tool by a servo motor (4) resulting from mechanical inaccuracies in the machine tool slides (2) and drive (3), an analogue error compensation signal (12) is generated by a compensation unit (1) in which is stored calibration data relating to the components of the positioning error. The error compensation signal (12) is summed by a summation unit (14) with the uncompensated analogue position error signal (7) generated at the output of a CNC controller (5), and the resulting signal (15), as modified by the usual velocity feedback signal 10' from the servo motor (4), is used to drive the servo motor (4). The resolution of the error compensation signal (12) is arranged to be greater than that of the position error signal (7), which is generally limited by the number of bits of the digital to analogue converter in the output stage of the controller (5). As the demand position is closely approached the servo (4) is driven substantially by the error compensation signal (12).

12 Claims, 3 Drawing Sheets

POSITION CONTROL METHOD AND APPARATUS FOR A CLOSED LOOP TYPE NUMERICALLY CONTROLLED MACHINE

This invention relates to error compensation systems for correcting or reducing positioning errors which arise when a movable body is positioned along a control axis by a servo motor/actuator means and particularly, but not exclusively, to machine tool error compensation systems for correcting or reducing positioning errors associated with the control of the tool position.

Such systems have been described for example in British Patent Specification GB 1 142 774 and European Patent Specification EP 0 049 153 A.

This invention relates more particularly, but not exclusively, to a numerically controlled machine tool of the kind comprising a tool holder driven by a tool drive, a tool positioning servo motor/actuator operating the tool drive and controlled in response to an analogue position error signal, a position transducer responsive to the position of the tool, tool holder or tool drive to provide a position feedback signal, and a numerically controlled controller responsive to a position demand signal and to the position feedback signal to produce the analogue position error signal. Such a machine tool will hereinafter be referred to as a "machine tool of the kind set forth".

The servo motor/actuator can be an electric servo motor or an electro-hydraulic servo motor/actuator.

In a machine tool of the kind set forth it is generally desirable to provide a velocity feedback loop. A velocity transducer is arranged to be responsive to the velocity of the tool drive or associated component to provide a velocity feedback signal, and a summation means is provided for combining the analogue position error signal with the velocity feedback signal to produce an analogue servo drive signal which is applied to the servo motor/actuator.

That type of feedback control is known in servo mechanism theory as "cascade control" or "minor-loop feedback" (see "Control System Principles and Design" by Ernest O. Doebelin, John Wiley & Sons 1985 page 13). As applied to a machine of the kind set forth the controller employs digital computing with a DAC (digital to analogue converter) at its output, whereas analogue methods are used in the dynamic control and stabilisation of the servo loops themselves.

However, in some machines of the kind set forth, and to which the invention can apply, there is no velocity feedback loop, but instead the position loop is of high gain.

The position transducer may be a digital transducer (encoder) or an analogue transducer (synchro, resolver etc.)

The accuracy of a machine tool is a limiting factor in the accuracy of finished parts machined by the machine tool. Errors in the motion of the tool itself produce an identical error in the finished part. Although designers of machine tools generally aim to minimise the errors in the movement of the tool by tackling the causes of such errors, this approach is extremely expensive, particularly when a very high accuracy is required. Also, that approach cannot generally be used to improve the accuracy of an existing machine without substantial rebuilding of the machine tool.

Some current high cost CNC machine controllers provide a degree of attempted compensation for errors in the mechanical movement of the tool. However, the compensation system employed generally involves measuring the tool positioning error at only a limited number of tool slide positions on a single axis, and those point errors are then used by the CNC controller to correct internally of the controller the computation of the position error signal applied to the tool positioning servo associated with that tool slide. No attempt is made in such systems to interpolate between or extrapolate from the point errors, each error value (converted into units of servo counts) is simply added to the "following error" as the slide physically passes the corresponding correction point during the execution of the programmed axis move or job operation. Thus, an error value is employed without modification until the next correction point is reached, whereupon the new error measurement is used until a subsequent correction point is reached. It will be appreciated that this method does not produce accurate error compensation for tool slide positions intermediate to the correction points.

As is known by those skilled in the art, the "following error" is the lag of the actual tool or tool slide position (depending upon the point of measurement by the position transducer i.e. whether the transducer is associated with the tool or with the tool slide respectively) from the demand position at any instant of time (and is proportional to the velocity of axis motion). The position demand signal is incrementally summed with the position feedback signal to produce the following error. The following error is then used to produce the position error signal to drive the axis servo in the next servo cycle, the change from a following error signal to a position error signal involving a change of units.

With such known high cost CNC controllers the output of the controller is an analogue position error signal which is applied to the input of the servo (in conjunction with a velocity feedback signal). The output stage of such a controller is a DAC typically with a resolution of no more than 12 bits. We have realised that any correction signal which is applied in the control system at a position prior to that digital to analogue converter will inevitably be restricted in its accuracy by the resolution of the 12 bit converter. We shall now demonstrate the restriction involved.

The maximum traverse rate of a high cost servo system is, say, 5000 mm/min. Such a servo has, typically, a position loop gain of 1800 mm/min/mm. This provides a maximum (steady state) following error of 5000/1800 = 2.78 mm.

The digital to analogue converter typically has a 10 volt output range and, to take account of the transient situation, the digital to analogue scaling would be 10 volts output for 2 × 2.78 mm = 5.56 mm. Since the resolution is limited to 12 bits (with 1 bit used for direction) then the best resolution achievable is 5.56/2048 = 0.0027 mm.

Therefore, no matter what refinements are included in the CNC controller to take account of tool positioning errors by way of the injection of an error compensation signal into the control system of the CNC controller itself, the resolution achievable can never be better than that determined by the digital to analogue converter, 0.0027 mm in the example.

This factor appears not to have been appreciated by the devisers of previous proposals for error compensation who have concentrated on implementing an error compensation within the CNC controller. An additional disadvantage of such proposals was that they sometimes utilised some of the restricted memory capacity of the CNC controller. This can mean that the functions of the CNC controller are restricted in other respects.

A general disadvantage of the previous proposals is that if they were to be applied to a CNC controller having no error compensation facility as manufactured, the internal circuitry or software of the controller required alteration. Whilst it may sometimes be economic to carry out such a modification when supplying new CNC machines, it would not generally be economic to modify old machines.

We have taken a broad look at the various errors which arise in the positioning of the tool relative to the workpiece with the aim of devising systems which, so far as possible, compensate for the mechanical errors in such positioning by the calculation of an error compensation signal which is used to adjust the tool drive signal applied to the input of the servo system associated with the tool movement.

A first aspect of the present invention is based on our idea of generating an analogue error compensation signal which is used to modify the analogue servo drive signal. Thus, we combine a correction signal with the (uncorrected) analogue position error signal generated by the (uncompensated) CNC controller, or with the velocity feedback signal.

We have set out to provide an error compensation unit which has its own memory such that the unit can be used, if desired, with existing machine tools to improve their accuracy whilst not affecting their functions in other ways.

Thus, one application of our invention is to existing machine tools where our compensation unit can be provided without any modifications being made to the CNC controller or to the tool slide servo system.

According to the first aspect of the present invention we provide a method of compensating for the effect of positioning errors in the positioning of a movable body in a body positioning apparatus of the kind comprising a body drive for positioning the body along a control axis, a body positioning servo motor/actuator means operating the body drive and controlled in response to an analogue position error signal, a position transducer responsive to the position of the body, body holder or body drive, and a digital controller responsive to a position demand signal and to the position feedback signal to produce, through a digital to analogue convertor, the analogue position error signal, characterised in that the method comprises monitoring the output of the position transducer and computing or selecting an analogue error compensation amount for the body position on the basis of stored calibration data corresponding to the position transducer output, and using the analogue error compensation amount to modify the servo drive signal.

According to a second aspect of the invention we provide a body positioning apparatus of the kind comprising a body carrier driven by a body drive for positioning the body along a control axis, a body positioning servo motor actuator means operating the body drive and controlled in response to an analogue position error signal, a position transducer responsive to the position of the body, body carrier or body drive, to provide a position feedback signal, and a digital controller having a digital to analogue convertor at its output, the controller being responsive to a position demand signal and to the position feedback signal to produce the analogue position error signal, the apparatus further comprising an error compensation means for compensating for or reducing the effect of repeatable errors in the positioning of the body, the error compensation means providing a correction or adjustment signal for modifying the control of the body position, characterised in that the error compensation means comprises a store of calibration data corresponding to the position transducer output, and the error compensation means provides an analogue error compensation amount which is summed with the analogue position error signal in producing the drive signal which is applied to the servo means.

When in a machine tool control system the machine tool is provided with a velocity feedback loop, the servo drive signal being produced by summing the analogue position error signal with the velocity feedback signal, the compensation amount may, of course, be summed either with the position error signal or with the velocity feedback signal prior to summing of those signals, provided of course that the correct positive or negative sense is chosen.

Thus, in effect, we permit the controller to compute the analogue position error signal from the unmodified position transducer signal and position demand signal, and then we apply a correction to that position error signal.

A significant advantage of making the compensation by modifying the analogue drive applied to the servo motor/actuator is that this can be done entirely independently of the controller operation itself which means that an existing or conventional controller can be employed, and no additional demand is made on the memory of the controller. Thus the error compensation signal can be generated in an independent error compensation unit the output of which can readily be interfaced with the controller output. Such a unit can readily be applied to an existing or new machine tool to improve substantially the tool positioning accuracy.

According to a third aspect of the invention we provide a positioning error correction unit adapted to be connected to a body positioning apparatus, the body positioning apparatus being of the kind comprising a body carrier driven by a body drive for positioning the body along a control axis, a body positioning servo motor/actuator means operating the body drive means and controlled in response to an analogue position error signal, a position transducer responsive to the position of the body, body carrier or body drive, to provide a position feedback signal, and a digital controller having a first digital to analogue convertor at its output, the controller being responsive to a position demand signal and to the position feedback signal to produce the analogue position error signal characterised in that the positioning error correction unit comprises an input for connection to the position transducer, a store for calibration data corresponding to the position transducer output, a digital processor for accessing the calibration data, and a second digital to analogue converter for providing an analogue output signal at an output connection of the unit, the output connection being adapted to be connected to a summation means arranged to sum the outputs from the first and second digital to analogue converters.

The controller is preferably a CNC (computer numerically controlled controller) but it could be a basic NC controller.

A scaling factor or ratio is preferably provided between the units of the analogue error compensation signal and the units of the analogue position error signal. That is, for a given following error amount and equal compensation error amount, the analogue position error signal (corresponding to the following error) is arranged to be greater than the corresponding error compensation signal by a scaling factor f which is greater than unity.

The scaling factor f is preferably greater than two.

Most preferably the scaling factor f is greater than four.

The scaling factor f is preferably an integer.

This scaling factor provides a ratio between the resolution of the analogue error compensation signal and the resolution of the position error signal in favour of the error compensation signal.

For small error amounts, when the tool is closely approaching the demand position, the analogue error compensation signal (of high resolution) will dominate the position error signal (of lower resolution) and accordingly a high degree of accuracy of tool position can be achieved, despite the fact that a "low" resolution NC controller is employed. As the tool closely approaches the commanded position the stepped output of the digital to analogue converter of the controller will enter the zero deadband, but the error compensation signal will provide the small servo drive signal required to drive the tool to the demand position.

Our studies of the tool positioning errors of uncompensated machine tools show various error components:

1) linear positioning error — these are non-periodic progressive errors associated with the linear displacement of an axis. It is the main type of error which existing commercially applied error compensation systems attempt to deal with.
2) cyclic errors — these are periodic errors largely due to eccentric components in the lead screw thread
3) backlash/hysteresis in the tool drive, which we find in general varies with the tool position
4) thermal fluctuations causing deformation of the machine tool structure, such as spindle thermal growth
5) multiple axis effects — when, as usual, the tool position is determine by two or more slides, displacement on one axis is influenced by displacements on the other axis. These errors are produced by geometrical inaccuracies in the machine tool structure.
6) deflection errors produced by machining loads The stored calibration data can include sets of reference values which correspond to some of the above error sources. Of course, items 4 and 6 would involve the use of additional transducers to measure temperature, and machine load respectively.

The stored data is preferably in the form of a look-up table which is conveniently held in a programmable memory, such as an E-PROM.

The data is loaded into the programmable memory in a calibration procedure during which the precise position of the tool and the angular and straightness errors relative to the machine bed are measured, conveniently by a laser interferometer, and the corresponding output signal of the position transducer/s is recorded.

We consider that it may be inventive in itself to isolate and use some of the foregoing error components as the basis for computing/selecting an error compensation signal. Whilst we prefer that the error compensation signal is then utilised in a manner which is in accordance with the first aspect of the invention, we do not wish to preclude the possibility that the error compensation signal may be used in other ways.

We consider that it is almost essential to deal with the multiple axis effects (5) mentioned above since any attempt to correct accurately for some or all of the single axis errors (1), (2), (3), (4), (6) above would be undermined by the errors produced by the generally substantial amounts of the multiple axis effects.

The multiple axis effects can conveniently be resolved, by conventional metrological analysis, into the following tool position error components:

a) three angular errors — pitch, yaw and roll associated with each axis.
b) three translatory errors — comprising of the positioning error associated with the desired direction of axis motion plus two straightness errors associated with motion in the directions perpendicular to the desired direction of axis motion.

These translatory errors together with the three angular errors provide six error components for each axis.

c) non-orthogonality errors, due to the out-of-squareness between the directions of the tool slide axes. This is simply the angular relationship between the xy, yz and xz planes of a three axis machine, giving three error figures.

For a 3-axis machine the error components (a) and (b) give 18 components in all, with (c) giving 3 components, to provide a total of 21 error components. Some of these may be irrelevant in practice depending upon their magnitude and the mechanical configuration of the machine.

If the machine further has rotational axes, further error components need to be considered for measurement and use in constructing an error compensation vector to be combined with the position error vector generated by the (uncompensated) CNC controller.

In order to measure the various error components in a three axis machine it is necessary to set up respective tool position measuring devices, such as laser measuring devices (but for roll a precise electronic level is employed), for each axis, and then to measure and record the magnitude of the relevant error components (both angular and translatory) along the full length of travel of each axis starting from a datum position common to all axes.

A separate measurement procedure is required to obtain the non-orthogonality figures (three angles).

The values of all the relevant error components for each axis are incorporated in look up tables, which may then be used to calculate the positioning error value at the tool point for any position in the working area or volume.

The following aspect of the invention is concerned with correcting for error component (5) listed above in a machine having at least two axes.

According to a fourth aspect of the invention an error compensation system for a numerically controlled machine tool comprises a programmable memory which has been loaded during a calibration procedure with a set of look up tables comprising (a) a set of relatively accurate measurements (or error components) for the tool position along a first axis each corresponding to (b) tool position transducer output values from a first transducer responsive to tool/tool holder/tool drive position on the first axis of movement (c) a set of error components for tool position along the first axis corresponding to (d) second tool position transducer output values from a second transducer responsive to tool/tool holder/tool drive position on a second axis of movement, the system including means adapted in use of the machine tool to take a value from the set (a) based on a measurement by the first transducer of the first axis position of the tool, and to modify that amount by taking an amount from set (c) corresponding to the measurement by the second transducer of the second axis position of the tool, the modified amount thus produced being used as the basis of an error compensation on control of the tool position along the first axis.

An adaptive compensation algorithm is used to combine the various error components, which for a machine having several axes is a complex task.

It will be appreciated that such a system would be capable of providing an accurate value for the precise position of the tool along the first axis irrespective of the position of the tool along the second axis, assuming that error component (5) was the sole error If it is also important to obtain precise positioning of the tool along the second axis then further look-up tables will need to be incorporated in the programmable memory to enable the computation of a corrected value or error for the tool position along the second axis for a particular combination of readings of the first and second transducers encountered in use.

According to a fifth aspect of the invention the look-up table/s produced in calibrating the tool slide/s can be used to correct the readings provided by the tool position transducers when the tool is replaced by a probe for checking the accuracy of a machined component.

Some embodiments of the invention will now be further described, by way of example only, with reference to the accompanying drawings in which.

Figure 1:
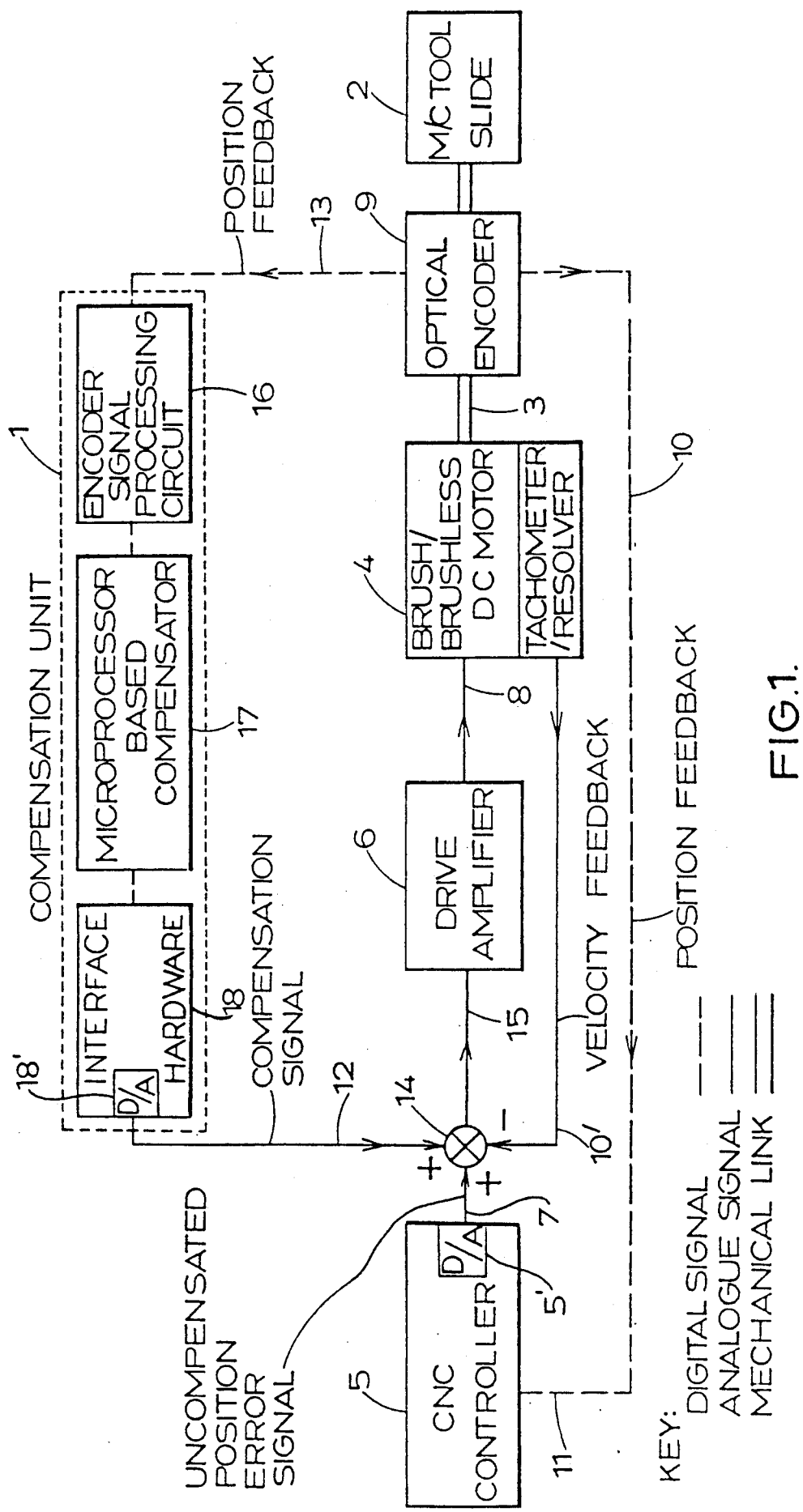
FIG. 1 is a block diagram of an error compensation system connected to a single axis CNC machine.

FIG. 1 shows the application of an error compensation unit 1 to an existing CNC machine comprising a tool slide 2, tool slide drive 3, drive motor 4 for the tool slide 2 and an uncompensated CNC controller 5, a drive amplifier 6 being positioned between the position error output 7 of the controller 5 and the control input 8 of the slide drive motor 4. An optical encoder 9 is associated with the spindle of the slide drive 3 to provide pulse signals corresponding to the degree of rotation of the slide drive from a datum. In the unmodified condition of the CNC machine the optical encoder 9 is used merely to provide a position feedback signal on line 10 to the position feedback input 11 of the controller 5. Within the controller 5 a position demand signal is generated in response to a programmed set of machining instructions appropriate to the particular machining operation to be performed, and a following error is computed, simply by taking the difference between the position demand signal and the position feedback signal.

The encoder 9 may alternatively be replaced by a transducer responsive to the tool slide or tool position. Instead of an optical encoder 9, an analogue transducer (synchro or resolver) could be employed in conjunction with an analogue to digital converter (ADC), which may be external to or incorporated in the controller 5.

In accordance with certain aspects of the invention the compensation unit provides an analogue compensation signal on line 12 in response to position feedback information provided on line 13 from the optical encoder 9. The uncompensated analogue position error signal at the output 7 of controller 5 is modified in response to the analogue compensation signal on line 12 in the summation unit 14, which also incorporates the velocity feedback signal 10' from a tachometer or resolver incorporated in motor 4, to provide a compensated servo drive signal on line 15 to control the drive motor 4.

The servo drive signal on line 15 is a velocity error signal, and the use of the position error signal on line 7 as the velocity demand signal applied to the velocity servo loop is known as "cascade control".

The compensation unit 1 essentially comprises an encoder signal processing circuit 16 adapted to convert the dual pulse output signals on line 13 into an uncorrected position signal, a microprocessor based compensator 17 which computes a positioning error amount from the uncorrected position signal by utilising a look-up table stored in an EPROM, and an analogue interface circuit 18 which converts the error amount into the analogue error compensation signal on line 12. It will be appreciated that, for a notional single axis machine, the EPROM stores a set of positioning error values corresponding to unique position measurements indicated by the optical encoder. The positioning error values are based on pre-recorded accurate measurements of the tool position (as previously measured with a laser interferometer).

It should be appreciated that FIG. 1 is a block diagram only and that there are several ways in which the invention could be implemented in accordance with the block diagram.

In particular there are various ways in which the three signals 7, 12 and 10' could be summed. They may all be summed together in one unit, in which case the summation unit 14 could be a pre-amplifier for the DC motor 4.

Alternatively the velocity feedback signal 10' could first be summed with the compensation signal (the velocity feedback signal 10' being of course negative feedback) in a servo comparator, and then the output of that unit could be summed with the position error signal 7 in a pre-amplifier which provides the signal 15 to the main drive amplifier 6.

Another possibility would be first to combine the (uncompensated) position error signal 7 with the compensation signal 12 to provide a compensated position error signal which is then summed in a motor pre-amplifier with the velocity feedback signal 10', to provide the signal 15 to the main drive amplifier 6. The summation of the uncompensated position error signal 7 with the compensation signal 12 can be performed in a suitable amplifier external to the controller 5. However, it would be possible in some cases to carry out the summation in the DAC output stage of the controller 5 if desired.

An important advantage gained by generating and utilising the error compensation signal 12 external to the controller 5 is that the resolution of the error compensation signal can be determined independently of the resolution associated with the position error output 7 of the controller 5. For example, the DAC 52 in the output stage of the controller 5 typically provides ±10 volts output corresponding to 12 bits input, whereas typically the DAC 182 incorporated in the interface hardware 18 can be arranged to provide ±2.5 volts output for 12 bits input. This means that the resolution of the compensation signal is four times that of the position error signal 7, and this scaling factor could be further increased if desired by reducing further the voltage range of the DAC 181 in element 18.

It will be appreciated that when the position error signal 7 is large, because the tool is well away from the demanded tool position (the position demand signal generated by the programme for controller 5), the error compensation signal 12 will be relatively small compared with the position error signal 7, and the servo motor 4 will be driven substantially in response to the signal 7. However, when the tool is approaching the demanded position, then the position error signal 7 will be relatively small, and the error compensation signal 12 will predominate in determining the velocity error signal 15 driving the servo motor 4. Furthermore, when the demanded position is closely approached the stepped output 7 of the controller will enter the zero deadband, and final positioning is determined entirely by the error compensation signal 12.

Thus, the scaling factor (four in the foregoing example) between the analogue output ranges of the DAC's 51 and 181 associated respectively with the outputs of the controller 5 and interface hardware 18 enables a substantially improved compensation for tool positioning errors to be achieved compared with what would be achievable by combining a compensation signal with the following error in controller 5.

It is preferred that the scaling factor is an integer, otherwise a sufficiently large position error signal might be generated, in response to the control exerted by the error compensation signal, to take the output of the controller out of the deadband again.

What is shown in FIG. 1 is merely a basic system in which it is assumed that there is only one axis of tool movement (one tool slide), and that there is a 1:1 correspondence between the optical encoder readings and the previously recorded accurate tool position values. In practice, as indicated previously, there are several other factors which are preferably taken into account and which necessitate a more complex set of look-up tables of error components to be stored in the EPROM. The compensator (17) will then combine the appropriate error components in order to compute a single error figure for each axis, thereby to provide an analogue compensation vector on line 12.

Figure 2:
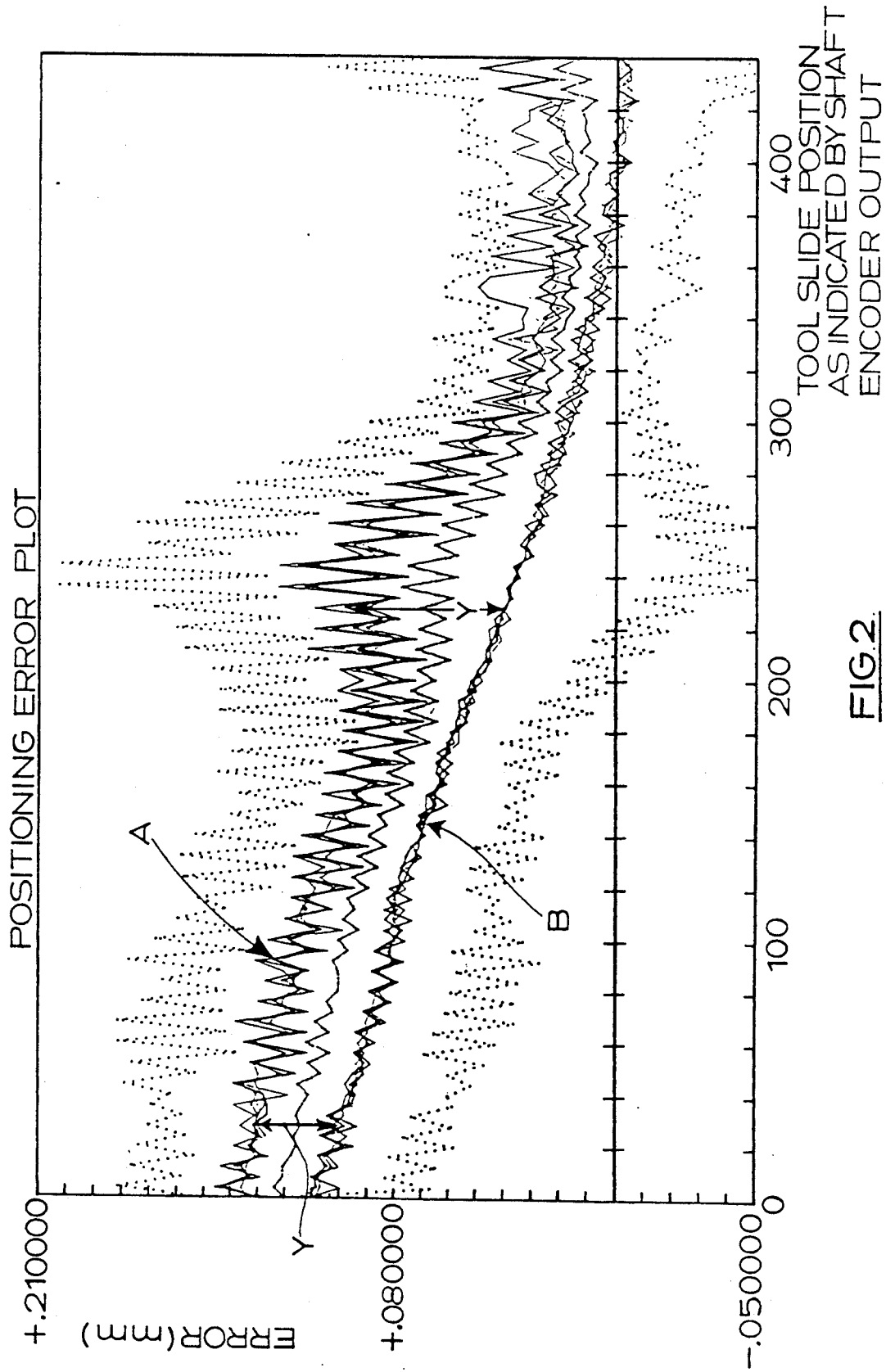
FIG. 2 shows plots of errors in tool position, as measured with a laser interferometer, against the tool position indicated by an encoder.

FIG. 2 shows positioning error plots for a typical single axis CNC tool drive assembly. The abscissa is the tool slide position as indicated by the output of an encoder associated with the slide drive screw, and the ordinate is the error figure which would have to be summed with the tool slide position as indicated by the encoder to produce the corrected tool slide position. The plots were produced by using a standard laser measuring system, a Hewlett Packard laser interferometer unit, to give a precise reading of the tool position corresponding to the shaft encoder output. An HP85 personal computer is used to collect and analyse the calibration data, and to calculate the compensation values, which are then "down loaded" into the memory device of the compensation system. A Renishaw laser system with an Amstrad 1640 or Compaq personal computer may alternatively be used to provide increased storage of compensation points.

In FIG. 2 plots A are five superimposed plots corresponding to the forward movement of the tool slide, and plots B are five superimposed plots corresponding to reverse movement of the tool slide. The vertical amount Y between the plots A and B corresponds to the backlash in the tool drive assembly, and this amount can be seen to vary with the tool slide position. The undulations in plots A and B represent cyclic errors, and it can be seen that the cyclic errors are generally larger in the plots A for forward movement than for the reverse slide movement of plots B. The five plots A do not coincide precisely due to random errors.

The EPROM which is programmed with the error readings from FIG. 2 and then inserted into compensator 16 stores an average value corresponding to the five curves A for each shaft encoder output together with a further set of average values corresponding to the three curves B.

It will be appreciated that the use of the summation unit 14 at the output of the controller 5 means that the compensation procedure need not interfere with the controller hardware or the operation of the controller 5, and in particular no demands are made on the memory of the controller.

Since the interface hardware can be tailored to suit a wide range of NC servo systems the error compensation system described can be readily adapted to suit different machines, without modification of the NC controller.

The processing circuit 16 is preferably configured to enable the edges of the usual dual-pulse signal from the encoder 9 to be counted rather than the complete "double-pulses" so as to increase the positioning accuracy, and this switching facility can be linked, if desired, to a resolution-change switch on the CNC controller.

Since the size of the memory associated with compensator 17 can be chosen at will, there is no effective limit to the number of compensation points that can be provided for each axis.

In order to utilise fully the information provided by the tool position encoder pulses it is desirable that the microprocessor contained in compensator 17 be arranged to run at a frequency greater than the maximum frequency of encoder pulses (typically > 100KHz). This is particularly desirable for a multi-axis machine where a complex volumetric compensation algorithm is used to take account of the multi-axis error components. It is an advantage of performing the calculation of the compensation signal external to the CNC controller that the frequency of the CNC microprocessor does not limit the calculating ability of the overall system. Even if the CNC microprocessor operated at a comparable frequency it would probably not be performing error updates continuously due to the other functions of the CNC controller that it has to perform, so that error updates would be infrequent.

Figure 3:
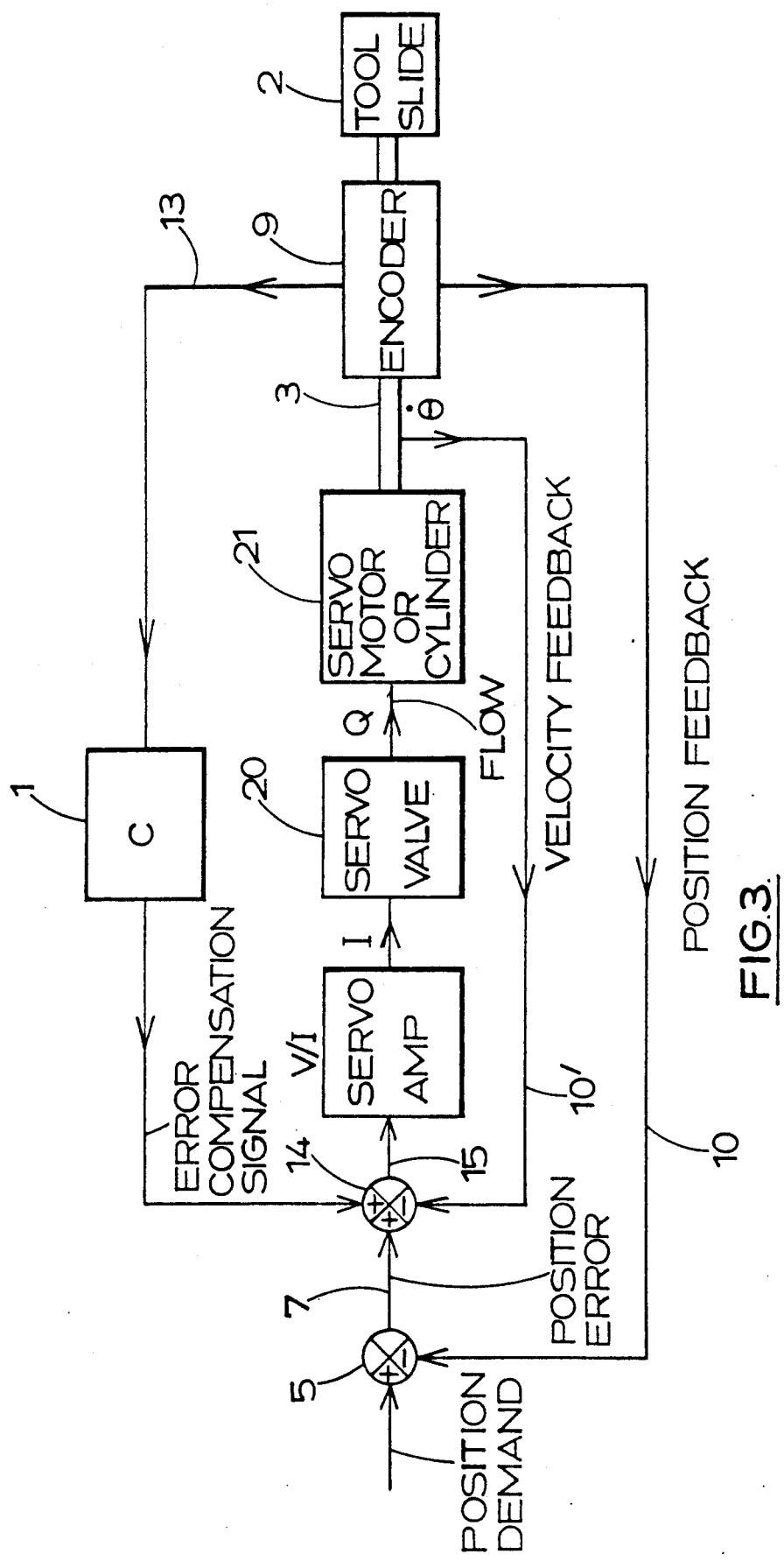
FIG. 3 is a block diagram similar to FIG. 1 but showing the invention applied to a NC machine with an electro-hydraulic servo motor.

FIG. 3 shows the invention applied to a (single axis) NC machine tool in which the tool slide 2 is driven by an electro-hydraulic servo motor assembly comprising a servo valve 20 and a servo motor or cylinder 21. When the unit 21 is a servo cylinder then it may not be possible to obtain a velocity feedback signal 10′, so that in some applications of the invention velocity feedback may be absent.

Although the invention has been described as applied to a machine tool, it should be appreciated that it is applicable to other devices, such as a plotter, in which a movable body is positioned along at least one control axis by a servo means in response to a position demand.

We claim:

1. A method of compensating for the effect of positioning errors in the positioning of a movable body in a body positioning apparatus having a body drive for positioning said body along a control axis, a body positioning servo actuator means operating said body drive and controlled in response to an analogue position error signal, a position transducer responsive to the position of said body drive, and a digital controller responsive to a position demand signal and to a position feedback signal to produce, through a digital to analogue converter, said analogue position error signal, comprising:

creating a store of calibration data, said calibration data having a look up table of positioning error values of said apparatus corresponding to readings of the output of said position transducer when said apparatus is operated in an uncompensated state wherein no error compensation is made on the basis of said calibration data, said positioning error values being determined by measuring the position of said body along said control axis when said body is positioned by said apparatus operating in said uncompensated state;

monitoring the current output of said position transducer;

deriving an analogue error compensation amount for the body position on the basis of said calibration data by using said look up table to give a pre-recorded positioning error value corresponding to said current output; and using said analogue error compensation amount to modify the drive signal to said servo.

2. A method as claimed in claim 1 wherein said analogue error compensation amount is summed with said analogue position error signal produced by said controller, thereby producing a modified servo drive signal.

3. A method as claimed in claim 1 wherein a scaling factor greater than unity is provided between the efficacy of said analogue position error signal and the efficacy of said analogue error compensation signal to produce a non-zero servo drive signal, that is for a given digital amount of said digital following error signal the corresponding non-zero analogue position error signal generated by a first digital to analogue converter is greater by said scaling factor than the analogue error compensation signal generated by a second digital to analogue converter from a digital compensation signal of equal digital amount.

4. A method as claimed in claim 1 wherein said body positioning apparatus is a machine tool positioning apparatus.

5. A body positioning apparatus having a body carrier driven by a body drive for positioning said body along a control axis, a body positioning servo motor actuator means operating said body drive and controlled in response to an analogue position error signal, a position transducer responsive to the position of said body drive, to provide a position feedback signal, and a digital controller having a digital to analogue converter at the output thereof, said controller being responsive to a position demand signal and to said position feedback signal to produce said analogue position error signal, comprising an error compensation means for reducing the effect of repeatable errors in the positioning of said body, said error compensation means providing an adjustment signal for modifying the control of the position of said body, said error compensation means having a store of calibration data said calibration data having a look up table of pre-recorded positioning error values of said apparatus corresponding to pre-recorded readings of said position feedback signal when said apparatus was operated in an uncompensated state in which no error compensation is made on the basis of said calibration data, said positioning error values having been determined by measuring the position of said body along said control axis when said body was positioned by said apparatus operating in said uncompensated state, wherein said error compensation means provides an analogue error compensation amount on the basis of said calibration data by using said look up table to give a pre-recorded positioning error value corresponding to said position feedback signal, said compensation amount being summed with said analogue position error signal in producing a servo means drive signal.

6. A body positioning apparatus as claimed in claim 5, wherein said error compensation means includes a digital processor and a second digital to analogue converter for providing said analogue error compensation amount, a scaling factor greater than unity being provided between the efficacy of said analogue position error signal, said analogue signal being produced by the controller from a digital following error signal, and the efficacy of said analogue error compensation signal to produce a non-zero servo drive signal so that for a given digital amount of the digital following error signal the corresponding analogue position error signal generated by the first digital to analogue converter of the controller is greater by said factor than that analogue error compensation signal generated by said second digital to analogue converter from a digital compensation signal of equal digital amount to said following error signal.

7. A numerically controlled machine tool having a tool holder driven by a tool drive, a tool positioning servo actuator operating said tool drive and controlled in response to an analogue positioning error signal, a position transducer responsive to the position of said tool drive to provide a position feedback signal, and a numerically controlled controller responsive to a position demand signal and to said position feedback signal to produce said analogue position error signal, comprising an error compensation means for reducing the effect of repeatable errors in the positioning of said tool, said error compensation means providing an adjustment signal for modifying the control of the position of said tool, said error compensation means having a store of calibration data said calibration data having a look up table of pre-recorded positioning error values of said apparatus corresponding to pre-recorded readings of said position feedback signal when said apparatus was operated in an uncompensated state in which no error compensation is made on the basis of said calibration data, said positioning error values having been determined by measuring precisely the position of said body along said control axis when said body was positioned by said apparatus operating in said uncompensated state, and said error compensation means providing an analogue error compensation amount on the basis of said calibration data by using said look up table to give a pre-recorded positioning error value corresponding to said position feedback signal, said compensation amount being summed with said analogue position error signal in producing a drive signal which is applied to said servo actuator.

8. A machine tool as claimed in claim 7 wherein a velocity feedback signal is also summed with said position error signal in producing said servo drive signal.

9. A machine tool as claimed in claim 7 in which a scaling factor greater than unity is provided between the efficacy of said analogue position error signal and the efficacy of said analogue error compensation signal to produce a non-zero servo drive signal so that for a given digital amount of said digital following error signal the corresponding non-zero analogue position error signal generated by a first digital to analogue converter is greater by a scaling factor than the analogue error compensation signal which would be generated by a second digital to analogue converter from a digital compensation signal of equal digital amount.

10. A machine tool as claimed in claim 9 in which said scaling factor is at least four.

11. A machine tool as claimed in claim 7 wherein said error compensation means includes a programmable memory having look up tables comprising: (a) a set of substantially accurate measurements for the tool position along a first axis; (b) tool position transducer output values from a first transducer responsive to tool drive position on the first axis of movement, each one of said values corresponding to one of said measurements, (c) a set of error components for determining tool position along the first axis (d) second tool position transducer output values from a second transducer responsive to tool drive position on a second axis of movement, said error compensation means including modifying means adapted in use of the machine tool to retrieve a value from the set (a) based on a measurement by the first transducer of the first axis position of the tool, and to modify that amount by taking an amount from set (c) corresponding to the measurement by the second transducer of the second axis position of the tool, the modified amount thus produced being used to produce the error compensation signal associated with the positioning of the tool along the first axis.

12. A positioning error correction unit for connection to a body positioning apparatus, said body positioning apparatus having a body carrier driven by a body drive for positioning a body along a control axis, body positioning servo actuator means operating said body drive and controlled in response to an analogue position error signal, a position transducer responsive to the position of said body driver for providing a position feedback signal, and a digital controller having a first digital to analogue converter at the output thereof, the controller being responsive to a position demand signal and to said position feedback signal for producing said analogue position error signal, the positioning error correction unit, comprising:

an input for connection to said position transducer, a store for calibration data; said calibration data including a look up table of pre-recorded positioning error values of said apparatus corresponding to pre-recorded readings of said position feedback signal when said apparatus was operated in an uncompensated state in which no error compensation is made on the basis of said calibration data, said positioning error values having been determined by measuring substantially accurately the position of said body along said control axis when said body was positioned by said apparatus operating in said uncompensated state, a digital processor for accessing the calibration data, and a second digital to analogue converter for providing an analogue error compensation signal at an output connection of the unit output connection being adapted to be connected to a summation for summing with the output of said first digital to analogue converter.

* * * * *

UNITED STATES PATENT AND TRADEMARK OFFICE
CERTIFICATE OF CORRECTION

PATENT NO. : 5,021,941

DATED : June 4, 1991

INVENTOR(S) : Derek G. Ford; Scott R. Postlethwaite

It is certified that error appears in the above-identified patent and that said Letters Patent is hereby corrected as shown below:

Column 7, Line 16, after "error", insert --.--.

Column 8, Line 63, after "DAC", delete "52" and substitute therefor --5$^1$--.

Column 8, Line 66, after "DAC", delete "182" and substitute therefor --18$^1$--.

Column 9, Line 4, after "DAC", delete "181" and substitute therefor --18$^1$--.

Column 9, Line 23, delete "51 and 181" and substitute therefor --5$^1$ and 18$^1$--.

Signed and Sealed this

Fourteenth Day of September, 1993

*Attest:*

BRUCE LEHMAN

*Attesting Officer*     *Commissioner of Patents and Trademarks*